US010740597B2

(12) United States Patent
Zhang et al.

(10) Patent No.: US 10,740,597 B2
(45) Date of Patent: Aug. 11, 2020

(54) METHOD AND APPARATUS FOR ACQUIRING INFORMATION

(71) Applicant: BAIDU ONLINE NETWORK TECHNOLOGY (BEIJING) CO., LTD., Beijing (CN)

(72) Inventors: Gang Zhang, Beijing (CN); Jin Lu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 186 days.

(21) Appl. No.: 16/050,947

(22) Filed: Jul. 31, 2018

(65) Prior Publication Data

US 2019/0102610 A1 Apr. 4, 2019

(30) Foreign Application Priority Data

Sep. 30, 2017 (CN) .......................... 2017 1 0915703

(51) Int. Cl.
*G06K 9/00* (2006.01)
*G06F 17/16* (2006.01)
*G06F 17/14* (2006.01)

(52) U.S. Cl.
CPC ....... *G06K 9/00295* (2013.01); *G06F 17/147* (2013.01); *G06F 17/16* (2013.01); *G06K 9/00268* (2013.01)

(58) Field of Classification Search
None
See application file for complete search history.

(56) References Cited

FOREIGN PATENT DOCUMENTS

| CN | 103530648 A | 1/2014 |
|---|---|---|
| CN | 105868695 A | 8/2016 |
| CN | 106228628 A | 12/2016 |
| CN | 106326868 A | 1/2017 |
| JP | 5503921 B2 | 5/2014 |

*Primary Examiner* — Fayyaz Alam

(74) *Attorney, Agent, or Firm* — Marshall, Gerstein & Borun LLP

(57) ABSTRACT

The present disclosure discloses a method and apparatus for acquiring information. The method comprises: acquiring images of a plurality of unregistered users, the unregistered users being users having no registered images belonging to the unregistered users in a face recognition system; calculating a maximum similarity corresponding to an image of each unregistered user, the maximum similarity being a maximum similarity among similarities between a face object in the image of the unregistered user and face objects in a plurality of registered images; and determining a similarity threshold corresponding to a preset condition based on the calculated maximum similarity corresponding to the image of the each unregistered user, the preset condition comprising a ratio of a number of images of the unregistered users with corresponding maximum similarities greater than the similarity threshold to a number of the images of the unregistered users being smaller than a ratio threshold.

11 Claims, 4 Drawing Sheets

METHOD AND APPARATUS FOR ACQUIRING INFORMATION

CROSS-REFERENCE TO RELATED APPLICATION

This application is related to and claims priority from Chinese Application No. 201710915703.0, filed on Sep. 30, 2017 and entitled "Method and Apparatus for Acquiring Information," the entire disclosure of which is hereby incorporated by reference.

TECHNICAL FIELD

The present disclosure relates to the field of computers, specifically to the field of face recognition, and more specifically to a method and apparatus for acquiring information.

BACKGROUND

The security of a face recognition system is the basis for normal operation of the face recognition system. How to control the intrusion risk of the face recognition system is a key to improve the security of face recognition system.

SUMMARY

The present disclosure provides a method and apparatus for acquiring information to solve the technical problems existing in the background section.

In a first aspect, the present disclosure provides a method for acquiring information, and the method includes: acquiring images of a plurality of unregistered users, the unregistered users being users having no registered images belonging to the unregistered users in a face recognition system; calculating a maximum similarity corresponding to an image of each unregistered user in the images of the plurality of unregistered users, the maximum similarity being a maximum similarity among similarities between a face object in the image of the unregistered user and face objects in a plurality of registered images; and determining a similarity threshold corresponding to a preset condition based on the calculated maximum similarity corresponding to the image of the each unregistered user, the preset condition including a ratio of a number of images of the unregistered users with corresponding maximum similarities greater than the similarity threshold in the images of the plurality of unregistered users to a number of the images of the plurality of unregistered users being smaller than a ratio threshold.

In a second aspect, the present disclosure provides an apparatus for acquiring information, and the apparatus includes: an acquiring unit, configured to acquire images of a plurality of unregistered users, the unregistered users being users having no registered images belonging to the unregistered users in a face recognition system; a calculating unit, configured to calculate a maximum similarity corresponding to an image of each unregistered user in the images of the plurality of unregistered users, the maximum similarity being a maximum similarity among similarities between a face object in the image of the unregistered user and face objects in a plurality of registered images; and a determining unit, configured to determine a similarity threshold corresponding to a preset condition based on the calculated maximum similarity corresponding to the image of the each unregistered user, the preset condition including a ratio of a number of images of the unregistered users with corresponding maximum similarities greater than the similarity threshold in the images of the plurality of unregistered users to a number of the images of the plurality of unregistered users being smaller than a ratio threshold.

The method and apparatus for acquiring information, provided by the present disclosure, are implemented by: acquiring images of a plurality of unregistered users, the unregistered users being users having no registered images belonging to the unregistered users in a face recognition system; calculating a maximum similarity corresponding to an image of each unregistered user, the maximum similarity being a maximum similarity among similarities between a face object in the image of the unregistered user and face objects in a plurality of registered images; and determining a similarity threshold corresponding to a preset condition based on the calculated maximum similarity corresponding to the image of the each unregistered user, the preset condition including a ratio of a number of images of the unregistered users with corresponding maximum similarities greater than the similarity threshold to a number of the images of the unregistered users being smaller than a ratio threshold. A similarity threshold enabling the risk of intrusion of the face recognition system to be controllable is determined, and the security of the face recognition system is improved.

BRIEF DESCRIPTION OF THE DRAWINGS

Other features, objectives and advantages of the present application will become more apparent by reading a detailed description of the nonrestrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
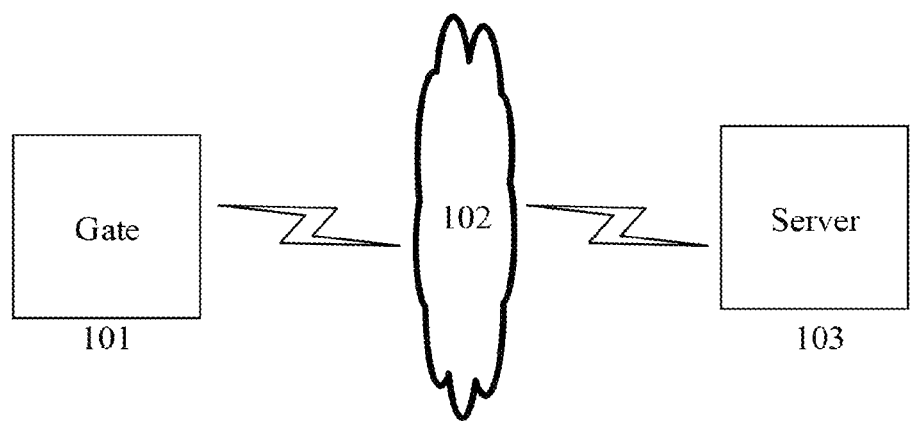
FIG. 1 is an exemplary system architecture in which the method for acquiring information according to the present disclosure may be applied.

Please refer to FIG. 1, FIG. 1 shows an exemplary system architecture diagram in which the method for acquiring information according to the present disclosure may be applied.

As shown in FIG. 1, the system architecture may include a gate 101, a network 102 and a server 103, and the network 102 may be a wired network. The server 103 may acquire a registered image registered in the face recognition system running on the gate 101. The server 103 may also acquire images of a plurality of unregistered users, and calculate the similarity between a face object in the image of each unregistered user among the images of the plurality of unregistered users and a face object in each registered image.

Figure 2:
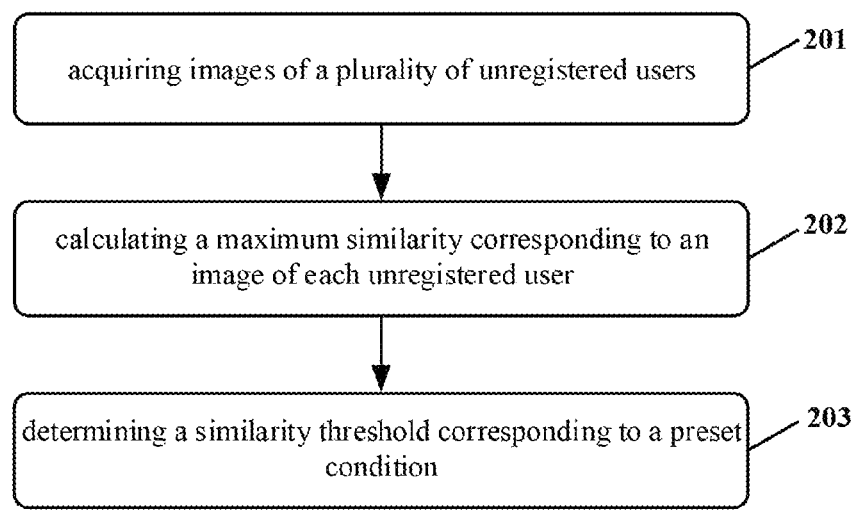
FIG. 2 is a flowchart diagram of an embodiment of the method for acquiring information according to the present disclosure.

Please refer to, FIG. 2 shows a flow of an embodiment of the method for acquiring information according to the present disclosure. It should be noted that the method for acquiring information, provided in the embodiment of the present disclosure, may be executed by a server (e.g., the server 103 in FIG. 1). The method includes the following steps.

Step 201, acquiring images of a plurality of unregistered users.

In the present embodiment, any person who may be subjected to identity verification by the face recognition system may be called as a user. The face of a user in an image may be called as a face object corresponding to the face of the user. When an image only includes one face object corresponding to the face of the user, the image may be called as an image of the user. For example, the image of the user may be a certificate photo only including one face object corresponding to the face of the user.

In the present embodiment, the registered image may refer to an image of a user registered in the face recognition system in advance. Registering an image of a user in the face recognition system may be equivalent to saving the correspondence between the image of the user and a user to which the image of the user belongs by the face recognition system.

For example, before the images of the plurality of unregistered users are acquired through step 201, terminals of a plurality of users may respectively send the images of the users, such as certificate photos of the users, to the server, and then the server sends the images of the users to the gate. The face recognition system running on the gate may receive certificate photos of users sent by different terminals of the users, and may save the correspondence between the received certificate photo of each user and the user each certificate photo belongs to.

In the present embodiment, when a user has no image registered in the face recognition system, the user may be called as an unregistered user. If any user image belonging to a user is not registered in the face recognition system, the user may be called as an unregistered user.

In the present embodiment, there may be a plurality of images belonging to an identical unregistered user in the acquired images of the plurality of unregistered users. Each user image belonging to an identical unregistered user is not registered in the face recognition system.

Step 202, calculating a maximum similarity corresponding to an image of each unregistered user.

In the present embodiment, after images of a plurality of unregistered users are acquired, the maximum similarity corresponding to the image of each unregistered user may be calculated. The maximum similarity corresponding to the image of the unregistered user is the maximum similarity among the similarities between a face object in the image of the unregistered user and face objects in a plurality of registered images. The face object in the image of the unregistered user may be a face object corresponding to the face of the unregistered user.

In the present embodiment, when calculating the maximum similarity corresponding to an image of an unregistered user, the similarity between a face object in the image of the unregistered user and a face object in each registered image of all registered images in the face recognition system may be calculated, so that the maximum similarity corresponding to the image of the unregistered user may be calculated.

In some optional implementations of the present embodiment, the number of acquired images of a plurality of unregistered users is greater than the number of registered images. For example, the number of the registered images in the face recognition system is 10 thousand, and the number of the acquired images of the unregistered users is 1 million.

In some optional implementations of the present embodiment, when calculating the similarity between the face object in the image of each unregistered user and the face object in each registered image of all the registered images in the face recognition system, a cosine similarity between a feature vector corresponding to the face object in the image of each unregistered user and a feature vector corresponding to the face object in each registered image may be calculated. A cosine similarity may be used as the similarity between a face object in an image of an unregistered user and a face object in a registered image.

For an image of an unregistered user, the cosine similarity between a feature vector corresponding to a face object in the image of the unregistered user and a feature vector corresponding to a face object in each registered image of all registered images in the face recognition system may be calculated, thus the similarity between the face object in the image of the unregistered user and the face object in each registered image of all the registered images in the face recognition system may be obtained.

When calculating the cosine similarity between the feature vector corresponding to the face object in the image of each unregistered user and the feature vector corresponding to the face object in each registered image of all the registered images, an unregistered feature matrix and a registered feature matrix may be generated first, each row in the unregistered feature matrix may be a feature vector corresponding to a face object in an image of an unregistered user, each column in the registered feature matrix may be a feature vector corresponding to a face object in a registered image, and data in the unregistered feature matrix and the registered feature matrix are respectively stored in a storage area with continuous addresses in a memory. Each component in a feature vector corresponding to a face object may correspond to a feature of a face corresponding to the face object. A feature vector corresponding to a face object may be acquired through a convolutional neural network. After the unregistered feature matrix and the registered feature matrix are generated, a product of the unregistered feature matrix and the registered feature matrix may be calculated to obtain the cosine similarity between the feature vector corresponding to the face object in the image of each unregistered user and the feature vector corresponding to the face object in each registered image of all the registered images.

For example, the number of registered images in the face recognition system is 10 thousand, and the number of acquired images of unregistered users is 1 million. When calculating the maximum similarity corresponding the image of each unregistered user in the images of the 1 million unregistered users, it is necessary to calculate, for the image of each unregistered user, the similarity between a face object in the image of the unregistered user and a face object in each registered image of the 10 thousand registered images, and 10 thousand times of similarity calculations are needed for the image of each unregistered user. Each row in the unregistered feature matrix is a feature vector corresponding to the face object in the image of each unregistered user among the images of the 1 million unregistered users respectively, and each column in the registered feature matrix is a feature vector corresponding to the face object in each of the 10 thousand registered images respectively. The unregistered feature matrix may be multiplied by the registered feature matrix to obtain the similarity between the face object in the image of each unregistered user in the images of the 1 million unregistered users and the face object in each of all the registered images, and further, the maximum similarity corresponding to the image of each unregistered user in the images of the 1 million unregistered users may be found. Since the data in the unregistered feature matrix and the registered feature matrix are stored continuously in the memory, the maximum similarity corresponding to the image of each unregistered user in the images of the 1 million unregistered users may be quickly calculated.

Step 203, determining a similarity threshold corresponding to a preset condition.

In the present embodiment, after the maximum similarity corresponding to the image of each unregistered user is calculated in step 202, the similarity threshold corresponding to the preset condition may be determined according to the maximum similarity corresponding to the image of each unregistered user. Determining the similarity threshold corresponding to the preset condition may be equivalent to satisfying the preset condition based on the determined similarity threshold.

In the present embodiment, the preset condition includes a ratio of the number of the images of the unregistered users with the corresponding maximum similarities greater than the similarity threshold in the images of the plurality of unregistered users acquired through step 201 to the number of the images of the plurality of unregistered users being smaller than a ratio threshold. In the face recognition system, when the corresponding maximum similarity of the image of an unregistered user is greater than the similarity threshold, that is, when the maximum similarity of the similarities between a face object in the image of an unregistered user and face objects in a plurality of registered images is greater than the similarity threshold, the unregistered user to whom the image of the unregistered user belongs may pass the identity verification of the face recognition system.

In the present embodiment, the ratio of the number of the images of the unregistered users with the corresponding maximum similarity greater than the similarity threshold in the acquired images of the plurality of unregistered users to the number of the acquired images of the plurality of unregistered users may be used to reflect the risk of intrusion of the face recognition system, and the lower the ratio is, the lower the risk of intrusion of the face recognition system is and the safer the face recognition system is.

In the present embodiment, the similarity threshold enabling the ratio of the number of the images of the unregistered users with the corresponding maximum similarity greater than the similarity threshold in the acquired images of the plurality of unregistered users to the number of the acquired images of the plurality of unregistered users to be smaller than a ratio threshold may be determined, so that the risk of intrusion of the face recognition system is controllable.

For example, if the number of the registered images in the face recognition system is 10 thousand, and the number of the acquired images of the plurality of unregistered users is 1 million, it is necessary to calculate the maximum similarity corresponding to the image of each unregistered user in the images of the 1 million unregistered users. The maximum similarity corresponding to the image of each unregistered user in the images of the 1 million unregistered users may be ranked. Suppose the risk of intrusion of the face recognition system may be controlled as the unregistered users to which the images of 10 unregistered users among the images of 1 million unregistered users belong may pass the verification, a similarity threshold may be determined to ensure that the maximum similarity corresponding to each of the images of only 10 unregistered users among the images of the 1 million unregistered users is greater than the similarity threshold, so that the unregistered users to which the images of only 10 unregistered users belong may pass the verification, and the risk of intrusion of the face recognition system may be controlled.

In some optional implementations of the present embodiment, the preset condition corresponding to the similarity threshold further includes a recognition pass rate being greater than a pass rate threshold. In other words, in addition to enabling the ratio of the number of the images of the unregistered users with the corresponding maximum similarity greater than the similarity threshold in the acquired images of the plurality of unregistered users to the number of the acquired images of the plurality of unregistered users to be smaller than the ratio threshold, the determined similarity threshold may also enable the recognition pass rate of the face recognition system to be greater than the pass rate threshold.

In the present embodiment, the recognition pass rate is a ratio of the number of users passing the identity verification after the identity verification is performed by the face recognition system to the number of all users subjected to the identity verification by the face recognition system.

In the present embodiment, a plurality of users may be subjected to identity verification performed by the face recognition system to calculate the recognition pass rate. When the face recognition system performs identity verification on a user, an image of the user may be collected first, and the image of the user includes a face object corresponding to the face of the user. Then, the similarity between the face object in the collected image of the user and the face object in each registered image in the face recognition system may be calculated so as to determine the maximum similarity among a plurality of calculated similarities. When the maximum similarity is greater than the similarity threshold, the user may pass the identity verification of the face recognition system.

In the present embodiment, the registered image may refer to an image of a user registered in the face recognition system in advance. Registering an image of a user in the face recognition system may be equivalent to saving the correspondence between the image of the user and a user to which the image of the user belongs by the face recognition system.

For example, before the identity verification is performed by the face recognition system on a plurality of users, terminals of the plurality of users may upload respective certificate photos of the users to a server, then the server sends the respective certificate photos of the plurality of users to a gate running the face recognition system to register the certificate photos of the plurality of users in the face recognition system. That is, the face recognition system may save the correspondence between the received certificate photo of each user and the user to which the certificate photo belongs.

In the present embodiment, the ratio of the number of the users finally passing the identity verification of the face recognition system to the number of the users participating in the identity verification may be calculated when a plurality of users are subjected to identity verification of the face recognition system, so that the recognition pass rate may be obtained.

Taking 10 thousand registered images in the face recognition system and 1 million acquired images of unregistered users as an example to illustrate the process of determining the similarity threshold corresponding to the preset condition: first, it is necessary to calculate the maximum similarity, namely, the similarity ranking TOP 1, among the similarities between a face object in an image of each unregistered user in the images of the 1 million unregistered users and the face objects in the 10 thousand registered images to obtain the TOP 1 similarity corresponding to the image of each unregistered user in the images of the 1 million unregistered users, and the TOP 1 similarity corresponding to the image of each unregistered user in the images of the 1 million unregistered users is ranked.

Suppose the risk of intrusion of the face recognition system may be controlled to be that the unregistered users to which the images of 10 unregistered users belong in the images of 1 million unregistered users may pass the identity verification, that is, only the maximum similarities corresponding to the images of 10 unregistered users are greater than the determined similarity threshold. First, a similarity threshold may be preliminarily determined to ensure that the maximum similarities corresponding to the images of only 10 unregistered users are greater than the preliminarily determined similarity threshold, and then, it may be judged whether the preliminarily determined similarity threshold may enable the recognition pass rate of the face recognition system to be greater than the pass rate threshold, for example, 99.9%. When the preliminarily determined similarity threshold cannot enable the recognition pass rate to be greater than the pass rate threshold, the preliminarily determined similarity threshold may be too high. A similarity threshold smaller than the preliminarily determined similarity threshold may be determined, and it may be judged again whether the newly determined similarity threshold may enable the face recognition pass rate to be greater than the pass rate threshold and also enable the maximum similarities corresponding to the images of only 10 unregistered users to be greater than the similarity threshold at the same time. By continuous adjustment, a similarity threshold that enables the maximum similarities corresponding to the images of 10 unregistered users to be greater than the similarity threshold and enables the face recognition pass rate to be greater than the pass rate threshold may be finally determined.

Figure 3:
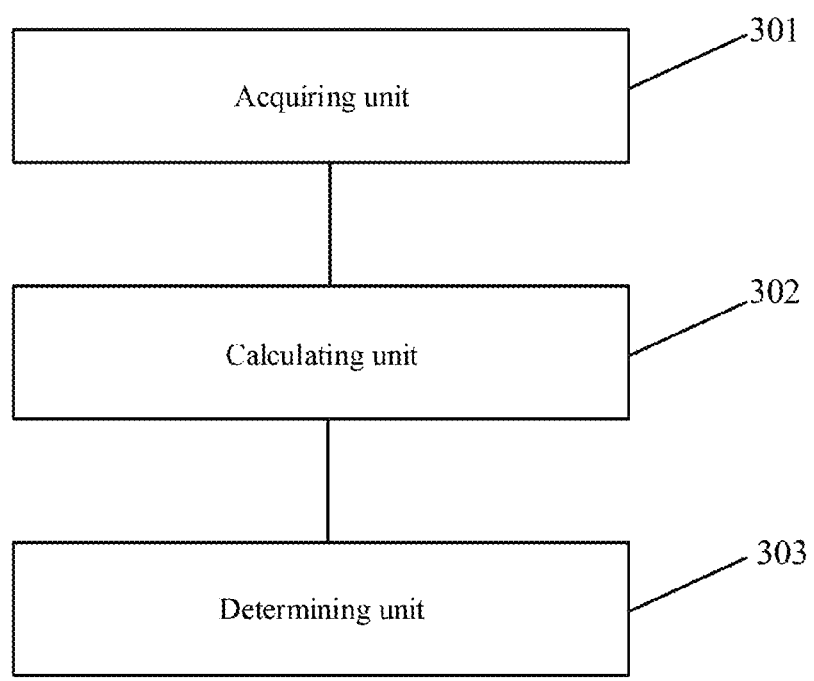
FIG. 3 is a schematic structural diagram of an embodiment of the apparatus for acquiring information according to the present disclosure.

Please refer to FIG. 3, as an implementation of the method shown in the above figures, the present disclosure provides an embodiment of an apparatus for acquiring information, and the embodiment of the apparatus corresponds to the embodiment of the method shown in FIG. 2.

As shown in FIG. 3, the apparatus for acquiring information includes: an acquiring unit 301, a calculating unit 302, and a determining unit 303. The acquiring unit 301 is configured to acquire images of a plurality of unregistered users, the unregistered users being users having no registered images belonging to the unregistered users in a face recognition system; the calculating unit 302 is configured to calculate a maximum similarity corresponding to an image of each unregistered user in the images of the plurality of unregistered users, the maximum similarity being a maximum similarity among similarities between a face object in the image of the unregistered user and face objects in a plurality of registered images; and the determining unit 303 is configured to determine a similarity threshold corresponding to a preset condition based on the calculated maximum similarity corresponding to the image of the each unregistered user, the preset condition including a ratio of a number of images of the unregistered users with corresponding maximum similarities greater than the similarity threshold in the acquired images of the plurality of unregistered users to a number of the images of the plurality of unregistered users being smaller than a ratio threshold.

In some optional implementations of the present embodiment, the preset condition further includes a recognition pass rate being greater than a pass rate threshold, wherein the recognition pass rate is a ratio of a number of users passing identity verification after the identity verification is performed by the face recognition system to a number of all users subjected to the identity verification by the face recognition system, and the face recognition system determines whether the user passes the identity verification on the basis of whether the maximum similarity among the similarities between a face object in the image of the user acquired during the identity verification and the face objects in the plurality of registered images is greater than the similarity threshold.

In some optional implementations of the present embodiment, the calculating unit includes: a similarity calculating subunit, configured to calculate a cosine similarity between a feature vector corresponding to a face object in the image of the each unregistered user and a feature vector corresponding to a face object in each registered image, and use the cosine similarity as the similarity between the face object in the image of the unregistered user and the face object in the registered image.

In some optional implementations of the present embodiment, the similarity calculating subunit is further configured to: calculate a product of an unregistered feature matrix and a registered feature matrix to obtain the cosine similarity between the feature vector corresponding to the face object in the image of the each unregistered user and the feature vector corresponding to the face object in the each registered image, wherein each row in the unregistered feature matrix is the feature vector corresponding to the face object in the image of the unregistered user, each column in the registered feature matrix is the feature vector corresponding to the face object in the registered image, and the unregistered feature matrix and the registered feature matrix are respectively stored in a storage area with continuous addresses in a memory.

In some optional implementations of the present embodiment, a number of the images of the plurality of unregistered users is greater than a number of the plurality of registered images.

Figure 4:
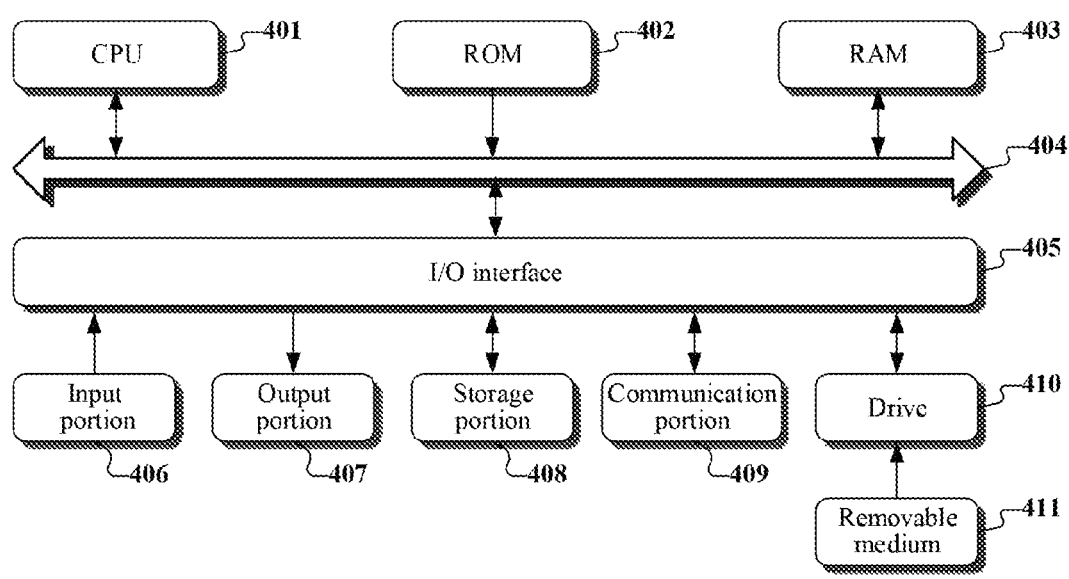
FIG. 4 is a schematic structural diagram of a computer system adapted to implement a server according to the embodiments of the present disclosure.

FIG. 4 shows a schematic structural diagram of a computer system adapted to implement a server according to the embodiments of the present disclosure.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system. The CPU 401, the ROM 402 and the RAM 403 are connected to each other through a bus 404. An input/output (I/O) interface 405 is also connected to the bus 404.

The following components are connected to the I/O interface 405: an input portion 406; an output portion 407; a storage portion 408 including a hard disk and the like; and a communication portion 409 including a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 409, and/or may be installed from the removable media 411. The computer program, when executed by the central processing unit (CPU) 401, implements the above mentioned functionalities as defined by the methods of the present disclosure.

The present disclosure further provides a server including an apparatus for acquiring information as described in FIG. 3. The server may be configured with one or more processors, and a memory for storing one or more programs, the one or more programs may include instructions for performing operations as described in steps 201 to 203. The one or more programs, when executed by the one or more processors, cause the one or more processors to perform the operations as described in steps 201 to 203.

The present disclosure further provides a computer-readable storage medium. The computer-readable storage medium may be the computer storage medium included in the server in the above described embodiments, or a stand-alone computer-readable storage medium not assembled into the server. The computer-readable storage medium stores one or more programs. The one or more programs, when executed by the server, cause the server to: acquiring images of a plurality of unregistered users, the unregistered users being users having no registered images belonging to the unregistered users in a face recognition system; calculating a maximum similarity corresponding to an image of each unregistered user in the images of the plurality of unregistered users, the maximum similarity being a maximum similarity among similarities between a face object in the image of the unregistered user and face objects in a plurality of registered images in the face recognition system; and determining a similarity threshold corresponding to a preset condition based on the calculated maximum similarity corresponding to the image of the each unregistered user, the preset condition including a ratio of a number of images of the unregistered users with corresponding maximum similarities greater than the similarity threshold to a number of the images of the unregistered users being smaller than a ratio threshold.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquiring unit, a calculating unit, and a determining unit, where the names of these units do not in some cases constitute a limitation to such units themselves. For example, the acquiring unit may also be described as "a unit for acquiring images of a plurality of unregistered users".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for acquiring information, the method comprising:
   acquiring images of a plurality of unregistered users, the unregistered users being users having no registered images belonging to the unregistered users in a face recognition system;
   calculating a maximum similarity corresponding to an image of each unregistered user in the images of the plurality of unregistered users, the maximum similarity being a maximum similarity among similarities between a face object in the image of the unregistered user and face objects in a plurality of registered images in the face recognition system; and
   determining a similarity threshold corresponding to a preset condition based on the calculated maximum similarity corresponding to the image of the each unregistered user, the preset condition comprising a ratio of a number of images of the unregistered users with corresponding maximum similarities greater than the similarity threshold in the images of the plurality of unregistered users to a number of the images of the plurality of unregistered users being smaller than a ratio threshold.

2. The method according to claim 1, wherein the preset condition further comprises a recognition pass rate being greater than a pass rate threshold, wherein the recognition pass rate is a ratio of a number of users passing identity verification after the identity verification is performed by the face recognition system to a number of all users subjected to the identity verification by the face recognition system, and the face recognition system determines whether the user passes the identity verification on the basis of whether the maximum similarity among the similarities between a face object in the image of the user acquired during the identity verification and the face objects in the plurality of registered images is greater than the similarity threshold.

3. The method according to claim 2, wherein the calculating the maximum similarity corresponding to an image of each unregistered user in the images of the plurality of unregistered users comprises:
   calculating a cosine similarity between a feature vector corresponding to a face object in the image of the each unregistered user and a feature vector corresponding to a face object in each registered image; and
   using the cosine similarity as the similarity between the face object in the image of the unregistered user and the face object in the registered image.

4. The method according to claim 3, wherein the calculating a cosine similarity between a feature vector corresponding to a face object in the image of the each unregistered user and a feature vector corresponding to a face object in each registered image comprises:
   calculating a product of an unregistered feature matrix and a registered feature matrix to obtain the cosine similarity between the feature vector corresponding to the face object in the image of the each unregistered user and the feature vector corresponding to the face object in the each registered image, wherein each row in the unregistered feature matrix is the feature vector corresponding to the face object in the image of the unregistered user, each column in the registered feature matrix is the feature vector corresponding to the face object in the registered image, and the unregistered feature matrix and the registered feature matrix are respectively stored in a storage area with continuous addresses in a memory.

5. The method according to claim 4, wherein a number of the images of the plurality of unregistered users is greater than a number of the plurality of registered images.

6. An apparatus for acquiring information, the apparatus comprising:
   at least one processor; and
   a memory storing instructions, the instructions when executed by the at least one processor, cause the at least one processor to perform operations, the operations comprising:
   acquiring images of a plurality of unregistered users, the unregistered users being users having no registered images belonging to the unregistered users in a face recognition system;
   calculating a maximum similarity corresponding to an image of each unregistered user in the images of the plurality of unregistered users, the maximum similarity being a maximum similarity among similarities between a face object in the image of the unregistered user and face objects in a plurality of registered images in the face recognition system; and
   determining a similarity threshold corresponding to a preset condition based on the calculated maximum similarity corresponding to the image of the each unregistered user, the preset condition comprising a ratio of a number of images of the unregistered users with corresponding maximum similarities greater than the similarity threshold in the images of the plurality of unregistered users to a number of the images of the plurality of unregistered users being smaller than a ratio threshold.

7. The apparatus according to claim 6, wherein the preset condition further comprises a recognition pass rate being greater than a pass rate threshold, wherein the recognition pass rate is a ratio of a number of users passing identity verification after the identity verification is performed by the face recognition system to a number of all users subjected to the identity verification by the face recognition system, and the face recognition system determines whether the user passes the identity verification on the basis of whether the maximum similarity among the similarities between a face object in the image of the user acquired during the identity verification and the face objects in the plurality of registered images is greater than the similarity threshold.

8. The apparatus according to claim 7, wherein the calculating the maximum similarity corresponding to an image of each unregistered user in the images of the plurality of unregistered users comprises:
   calculating a cosine similarity between a feature vector corresponding to a face object in the image of the each unregistered user and a feature vector corresponding to a face object in each registered image, and
   using the cosine similarity as the similarity between the face object in the image of the unregistered user and the face object in the registered image.

9. The apparatus according to claim 8, wherein the calculating a cosine similarity between a feature vector corresponding to a face object in the image of the each unregistered user and a feature vector corresponding to a face object in each registered image comprises:

calculating a product of an unregistered feature matrix and a registered feature matrix to obtain the cosine similarity between the feature vector corresponding to the face object in the image of the each unregistered user and the feature vector corresponding to the face object in the each registered image, wherein each row in the unregistered feature matrix is the feature vector corresponding to the face object in the image of the unregistered user, each column in the registered feature matrix is the feature vector corresponding to the face object in the registered image, and the unregistered feature matrix and the registered feature matrix are respectively stored in a storage area with continuous addresses in a memory.

10. The apparatus according to claim 9, wherein a number of the images of the plurality of unregistered users is greater than a number of the plurality of registered images.

11. A non-transitory computer storage medium storing a computer program, the computer program when executed by one or more processors, causes the one or more processors to perform operations, the operations comprising:

acquiring images of a plurality of unregistered users, the unregistered users being users having no registered images belonging to the unregistered users in a face recognition system;

calculating a maximum similarity corresponding to an image of each unregistered user in the images of the plurality of unregistered users, the maximum similarity being a maximum similarity among similarities between a face object in the image of the unregistered user and face objects in a plurality of registered images in the face recognition system; and determining a similarity threshold corresponding to a preset condition based on the calculated maximum similarity corresponding to the image of the each unregistered user, the preset condition comprising a ratio of a number of images of the unregistered users with corresponding maximum similarities greater than the similarity threshold in the images of the plurality of unregistered users to a number of the images of the plurality of unregistered users being smaller than a ratio threshold.

* * * * *